United States Patent [19]

Kulik

[11] 4,355,328

[45] Oct. 19, 1982

[54] 360 DEGREE CLOSED CIRCUIT TELEVISION SYSTEM

[75] Inventor: John J. Kulik, Longwood, Fla.

[73] Assignee: The United States of America as represented by the Secretary of the Navy, Washington, D.C.

[21] Appl. No.: 236,948

[22] Filed: Feb. 23, 1981

[51] Int. Cl.³ .............................................. H04N 7/18
[52] U.S. Cl. ..................................... 358/87; 358/104; 358/183; 434/43
[58] Field of Search ......................... 358/87, 183, 104; 434/43

[56] References Cited

U.S. PATENT DOCUMENTS

| | | | |
|---|---|---|---|
| 3,479,454 | 11/1969 | Wolff | 358/183 |
| 3,525,804 | 8/1970 | Owen | 358/104 |
| 3,542,948 | 11/1970 | Wolff | 358/87 |
| 3,560,644 | 2/1971 | Petrocelli | 358/87 |
| 4,012,126 | 3/1977 | Rosendahl | 350/198 |
| 4,103,435 | 8/1978 | Herndon | 358/104 |
| 4,197,509 | 4/1980 | Curran | 328/67 |

*Primary Examiner*—Howard Britton
*Attorney, Agent, or Firm*—Robert F. Beers; Robert W. Adams; David S. Kalmbaugh

[57] ABSTRACT

A 360 degree closed circuit television system is disclosed which includes six background scene cameras, each camera of which scans a sixty degree segment of a background scene appearing on a 360 degree reflective display screen, and each camera of which provides a background information signal in response to scanning of the background scene; and six target cameras, each target camera of which scans a target, and each camera of which provides a target information signal in response to scanning of the target.

The background scene and target information signals are then supplied to an electronic gating circuit which synthesizes the background scene and target information signals so as to produce six background scene-target information signals. Each background scene-target information signal activates one of six projectors with each projector, in turn, broadcasting a sixty degree segment of the background scene upon one screen element of a hexagonal shaped transparent display screen. In addition, each projector broadcast on the transparent display screen the target for a predetermined time period such that an observer will observe the target moving around the transparent display screen. Movement of the target about the transparent display screen is controlled by a digital computer in accordance with a target movement program.

16 Claims, 7 Drawing Figures

360 DEGREE CLOSED CIRCUIT TELEVISION SYSTEM

BACKGROUND OF THE INVENTION

1. Field of the Invention

This invention relates generally to television systems. In particular, this invention relates to a 360 degree closed circuit television system which insets a moving target against a background scene so as to simulate the motion of a real target.

2. Description of the Prior Art

In the past, numerous television and other multiple channel video display systems have been developed to probe images, modelboards, scenes, or the like at one place and display them at another place. Such television and other video display systems have often been utilized in training devices so as to provide for the training of military personnel in a realistic environment at a considerable cost savings. Most such systems of the prior art are well known to the artisan, thereby obviating the need for a further discussion thereof.

However, there are several prior art devices which are of some significance, inasmuch as they at least remotely or indirectly concern subject matter that is pertinent to the system constituting the subject invention.

For example, U.S. Pat. No. 3,542,948 to Hanns H. Wolff discloses a plurality of television cameras mounted on a first rotating drum so that each scans a 360 degree field of view, and a plurality of television projectors adapted to receive the video output of the television cameras, and mounted on a second rotating drum which rotates in synchronism with the first rotating drum. The television projectors, in turn, project a view onto a 360 degree cylindrical screen. The cameras and projectors scan a narrow, approximately vertical line while the rotational motion of the drums effects horizontal scanning.

U.S. Pat. No. 3,560,644 to Edward A. Petrocelli, and Robert G. Palmer discloses a multiple projection television system which utilizes a plurality of television projectors, each of which projects a picture on a respective sector of a circular screen. Circuitry is provided for synchronizing the projectors with the cameras so that a ship may be caused to move across a screen. In addition, the aforementioned circuitry enables any projector to project video information from any or all cameras.

U.S. Pat. No. 4,103,435 to John W. Herndon discloses a head trackable wide angle visual system which probes a model board and causes selected image portions of the model board to be projected on a trio of display sectors located on the inside of a spherical screen, with the view of the modelboard being displayed on the screen in accordance with control signals that are proportional to the turning of the head of a trainee pilot. A head position sensor, a cockpit, a switching logic circuit, a synchronization signal generator, a trio of video switches, the aforementioned screen, and left, middle, and right light projectors are combined to provide such effects so as to simulate a real-life pilot training environment from a model thereof.

From an inspection of the aforementioned and other similar patents, it may be inferred that many attempts have been made to simulate real life training scenes or other scenes by mechanical, electrical, or optical means. However, such multiple channel video display systems of the prior art ordinarily leave something to be desired in that the visual images displayed thereby are often distorted due to the improper matching of picture elements across adjacent screen elements. In addition, the aforementioned system of the prior art are complex, do not operate in exactly the same manner as the subject invention, and contain a combination of elements that is somewhat different from the present invention.

SUMMARY OF THE INVENTION

The subject invention overcomes some of the disadvantages of the prior art, including those mentioned above, in that it comprises a relatively simple video display system which eliminates any distortion from a visual image displayed thereby. This, in turn, provides a distortion-free visual image such that a more realistic training environment for the training of military personnel or the like may be obtained.

Included in the subject invention are six television cameras, each one of which scans sixty degrees of a background scene appearing on a 360 degree reflective display screen, and provides a background scene information signal in response to the scanning of the background scene thereby; and six television cameras, each one of which scans a target, and provides a target information signal in response to the scanning of the target thereby.

The background scene and target information signals are then supplied to an electronic gating circuit which synthesizes the aforementioned information signals so as to produce six background scene-target information signals. Each background scene-target information signal activates one of six projectors with each projector, in turn, broadcasting a sixty degree segment of the above mentioned background scene upon one screen element of a hexagonal shaped transparent display screen. In addition, each projector broadcasts the target on the hexagonal shaped transparent display screen for a predetermined time period such that an observer will observe the movement of the target around the transparent display screen. Movement of the target in an azimuthal direction around the transparent display screen is controlled by a digital computer in accordance with a target movement control program.

DESCRIPTION OF THE PREFERRED EMBODIMENT

Figure 1:
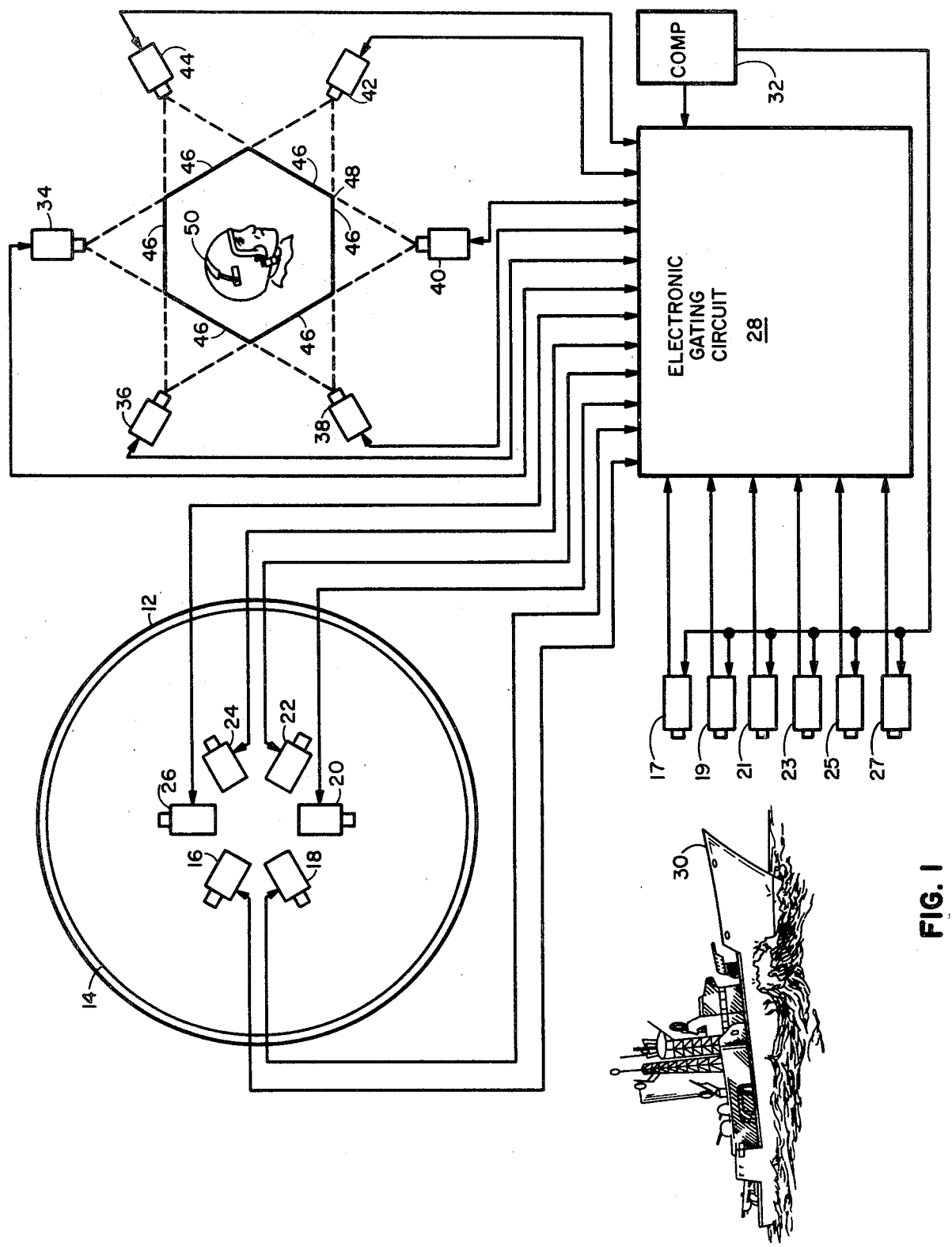
FIG. 1 is a combination block and schematic diagram of the 360 degree closed circuit television system constituting the subject invention.

The preferred embodiment of the subject invention will now be discussed in some detail in conjunction with all of the figures of the drawing, wherein like parts are designated by like reference numerals insofar as it is possible and practical to do so.

Referring now to FIG. 1, there is shown a 360 degree closed circuit television system 12 comprising a 360 degree reflective display screen 14 which has projected onto the inner surface thereof by suitable projecting means, not shown, a background scene. The aforementioned projecting means utilized by the subject invention may be, for example, a 360 degree annular image transfer apparatus which is disclosed in U.S. Pat. No. 4,012,126 issued to Gottfried R. Rosendahl and Wiley V. Dykes.

Positioned within 360 degree reflective display screen 14 off the center thereof are six television cameras 16, 18, 20, 22, 24, and 26, each of which has an input-output terminal connected to one of six input-output terminals of an electronic gating circuit 28, and each of which scans sixty degrees in an azimuthal direction of the background scene appearing on reflective display screen 14.

Respectively connected to six data inputs of electronic gating circuit 28 are the outputs of six television cameras 17, 19, 21, 23, 25, and 27, each of which scans a target 30 positioned adjacent thereto. At this time, it may be noted that target 30 may be, for example, an aircraft or a battleship. In addition, there is connected to the control input terminal of electronic gating circuit 28, the control output terminal of a digital computer 32, the sync output terminal of which is connected to the sync inputs of cameras 17, 19, 21, 23, 25, and 27.

At this time, it may be noteworthy to mention that there are commercially available a wide variety of digital computers which may be utilized as computer 32 of the subject invention. In particular, it has been found that a digital computer, Model SFL-3255 manufactured by Systems Engineering Lab of Fort Lauderdale, Florida, performs quite satisfactorily as computer 32.

Respectively connected to six input-output terminals of electronic gating circuit 28 are the input-output terminals of six projectors 34, 36, 38, 40, 42, and 44. Each of the six projectors 36 through 44, is positioned adjacent to the outer surface of one of six rectangular shaped screen elements 46 of a hexagonal shaped transparent display screen 48. This, in turn, allows each of the aforementioned projectors 34 through 44 to broadcast upon an adjacent screen element 46 of display screen 48 a sixty degree segment of the background scene appearing on screen 14. In addition, each projector 36 through 44 will broadcast upon screen 48 for a predetermined time period target 30, such that target 30 will move in an azimuthal direction about transparent display screen 48, thereby allowing an observer 50 to observe the movement of target 30 about transparent display screen 48, as will be discussed more fully below.

Of course, it may be noted at this time that observer 50 may be a pilot, a seaman, an infantryman, or the like, depending upon the training environment upon which the subject invention is to be utilized.

Figure 2:
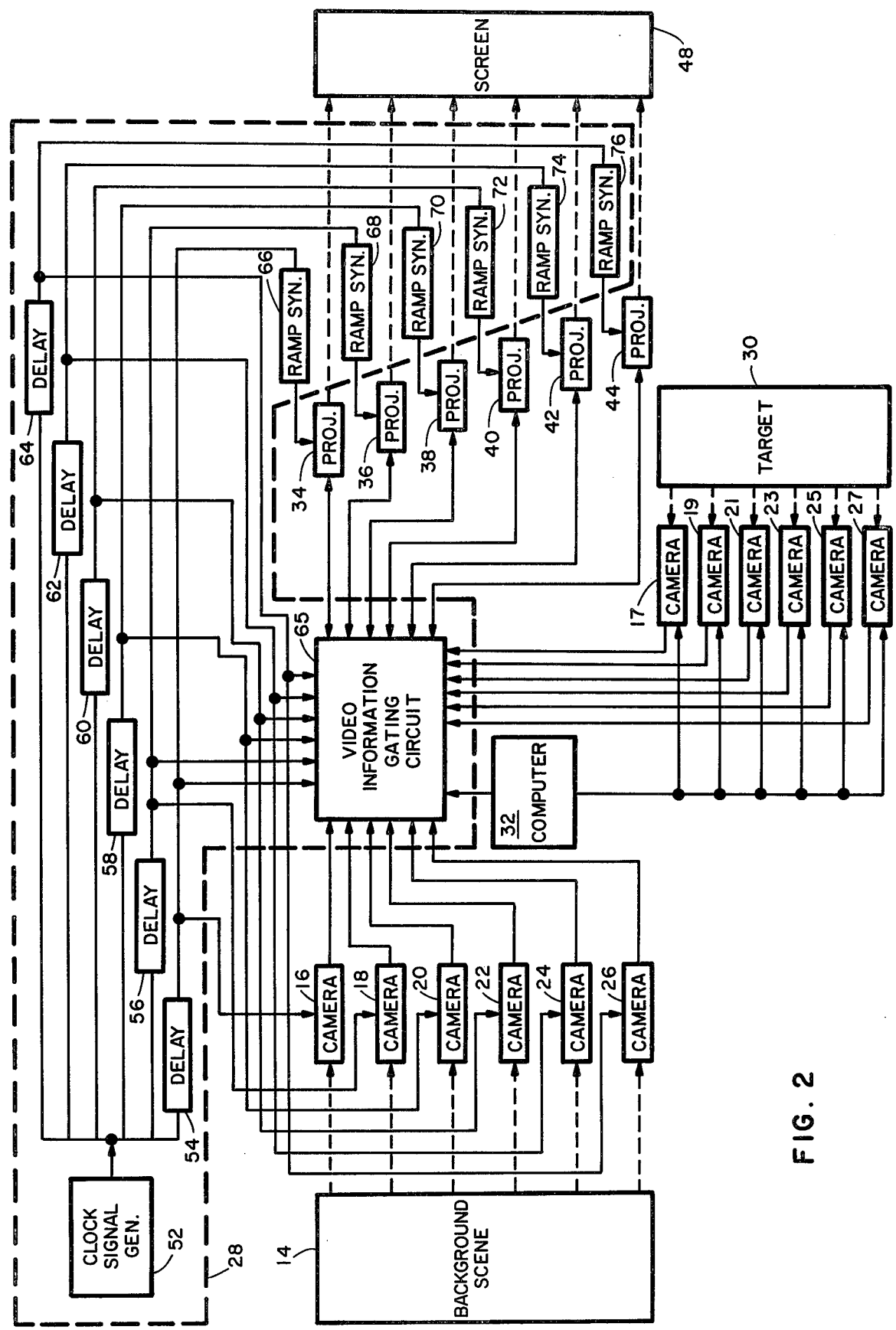
FIG. 2 is an electrical block diagram of the invention of FIG. 1.

Referring now to FIG. 2, there is shown electronic gating circuit 28 which includes a master clock signal generator 52, the frequency of which is dependent upon the scan rate at which cameras 16, 18, 20, 22, 24, and 26, and projectors 34 thru 44 operate. For 360 degree closed circuit television system 12, a 525 line television system was selected. This, in turn, requires master clock signal generator 52 to provide at the output thereof a clock signal having a series of uniformly spaced pulses, the frequency of which is 15.75 kilohertz.

At this time, it should be noted that vertical scanning is utilized within the subject invention so as to allow for a smooth transition of the visual image appearing upon adjacent screen elements 46 of display screen 48. This, in turn, requires that cameras 16 thru 27, and projectors 34 thru 44 be rotated ninety degrees from their normal operating position.

Connected to the output of clock signal generator 52 are the inputs of six delay timers 54, 56, 58, 60, 62, and 64, each of which may be, for example, any conventional and commercially available monostable multivibrator.

The output of delay timer 54 is, in turn, connected to the sync input of camera 16, the first sync input of a video information gating circuit 65, and the input of a ramp voltage synthesizer circuit 66, the output of which is connected to the sync input of projector 34. Similarly, the output of delay timer 56 is connected to the sync input of camera 18, the second sync input of gating circuit 65 and the input of a ramp voltage synthesizer circuit 68, the output of which is connected to the sync input of projector 36. Likewise, the output of delay timer 58 is connected to the sync input of camera 20, the third sync input of gating circuit 65, and the input of a ramp voltage synthesizer circuit 70, the output of which is connected to the sync input of projector 38.

The output of delay timer 60 is connected to the sync input of camera 22, the fourth sync input of gating circuit 65, and the input of a ramp voltage synthesizer circuit 70, the output of which is connected to the sync input of projector 40. Similarly, the output of delay timer 62 is connected to the sync input of camera 24, the fifth sync input of gating circuit 65 and the input of a ramp voltage synthesizer circuit 74, the output of which is connected to the sync input of projector 42. Likewise, the output of delay timer 64 is connected to the sync input of a camera 26, the sixth sync input of gating circuit 65 and the input of a ramp voltage synthesizer circuit 76, the output of which is connected to the sync input of projector 44.

It should be noted at this time that ramp voltage synthesizer circuits 66, 68, 70, 72, 74, and 76 are fully described in U.S. Pat. No. 4,197,509 to William J. Curran and John J. Kulik, and will be discussed more fully below in describing the operation of the present invention.

Referring again to FIG. 2, the control output terminal of computer 32 is connected to the control input terminal of gating circuit 65, and the sync output terminal of computer 32 is connected to the sync inputs of cameras 17, 19, 21, 23, 25, and 27, with the output of each camera 17, 19, 21, 23, 25 and 27 connected to one of the six data inputs of video information gating circuit 65. The outputs of cameras 16, 18, 20, 22, 24, and 26 are respectively connected to the remaining data inputs of video information gating circuit 65.

The six input-output terminals of video information gating circuit 65 are, in turn, respectively connected to the six input-output terminals of projectors 34 thru 44. In addition, the control output terminal of digital computer 32 is connected to the control input terminal of video information gating circuit 65.

Figure 3:
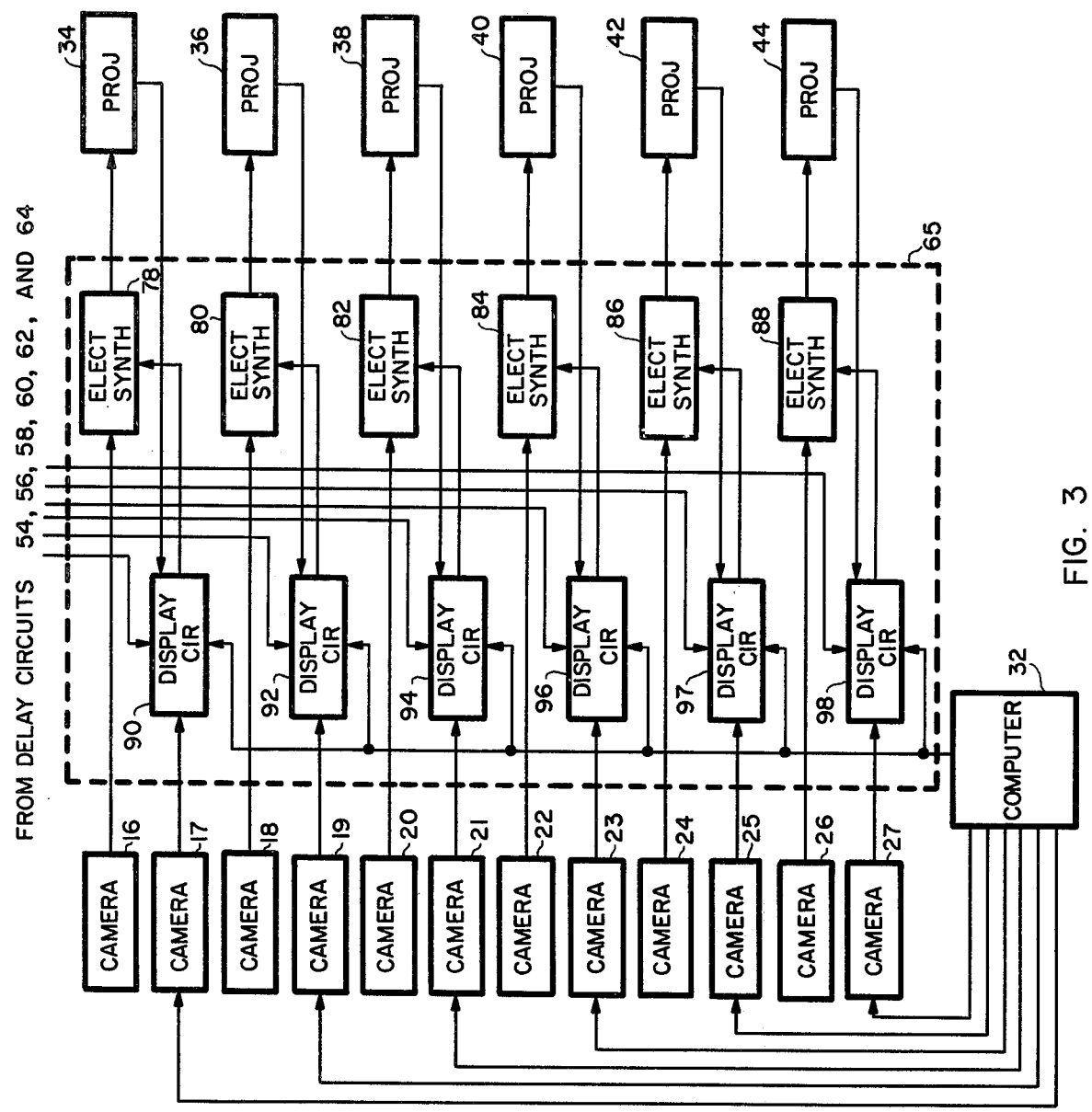
FIG. 3 is an electrical block diagram of the video information gating circuit of FIG. 2.

Referring now to FIG. 3, there is shown video information gating circuit 65 which includes six electronic synthesizer circuits 78, 80, 82, 84, 86, and 88, the first data inputs of which are respectively connected to the outputs of cameras 16, 18, 20, 22, 24, and 26. The data outputs of electronic synthesizer circuits 78 thru 88 are, in turn, respectively connected to the data inputs of projectors 34 thru 44.

The control output terminal of digital computer 32 is connected to the control input terminals of six gated video display circuits 90, 92, 94, 96, 97, and 98, the outputs of which are respectively connected to the second data inputs of electronic synthesizer circuits 78 thru 88. In addition, the blanking signal outputs of projectors 34 thru 44 are respectively connected to the blanking signal inputs of display circuits 90 thru 98. The six sync outputs of computer 32 are respectively connected to the sync inputs of cameras 17, 19, 21, 23, 25, and 27. The outputs of cameras 17, 19, 21, 23, 25, and 27 are, in turn, connected to the data inputs of display circuits 90 thru 98.

Referring now to FIGS. 2 and 3, the outputs of delay timers 54, 56, 58, 60, 62, and 64 are respectively connected to the sync inputs of gated video display circuits 90, 92, 94, 96, 97, and 98. It should be noted at this time that each of the above mentioned gated video display circuits 90 thru 98 is a modification of the gated video display circuit disclosed in U.S. Pat. No. 3,525,804 to Joseph R. Owens. In addition, it may be noted that electronic synthesizer circuits 78 thru 88 may each be an electronic synthesizer circuit of the type disclosed in U.S. Pat. No. 3,479,454 to Hanns H. Wolff.

Figure 4:
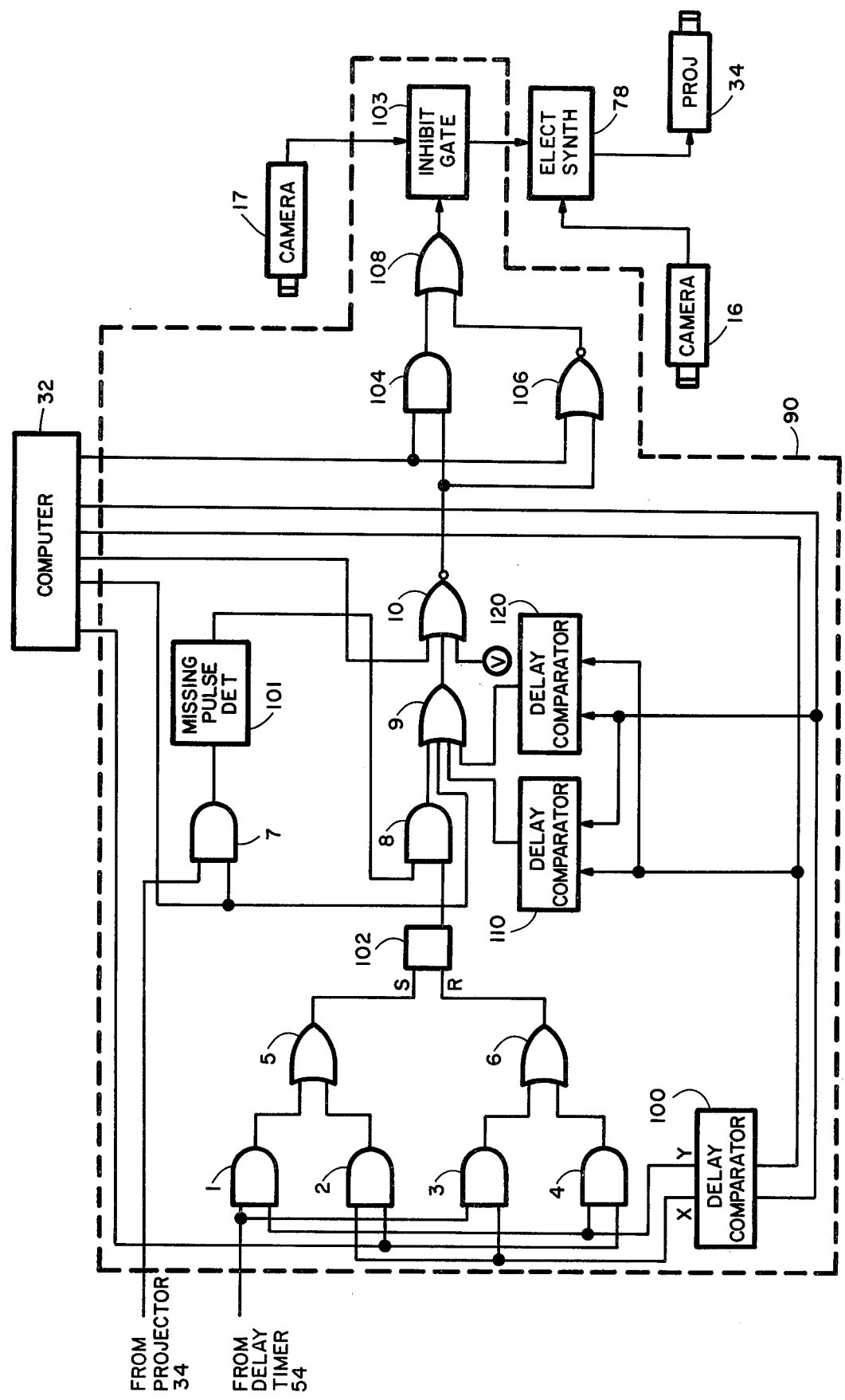
FIG. 4 is an electrical schematic diagram of one of the gated video display circuits of FIG. 3.

Referring now to FIG. 4, there is shown an electrical schematic diagram of gated video display circuit 90 which, as mentioned above, is a modification of the gated video display circuit disclosed in U.S. Pat. No. 3,525,804. Because all of the aforementioned gated video display circuits 90 thru 98 operate in exactly the same way and for the sake of keeping this disclosure as simple as possible, only gated video display circuit 90 will be described.

As disclosed in U.S. Pat. No. 3,525,804 NOR gate 10 is connected to the first input of inhibit gate 103. In addition, as disclosed in the above mentioned Owens Patent, the output of inhibit gate 103 is connected to the input of a television monitor.

In the present invention the output of NOR gate 10 is connected to the first input of an AND gate 104, and the first input of a NOR gate 106, the output of which is connected to the first input of an OR gate 108, with the output thereof connected to the first input of inhibit gate 103. In addition, the output of AND gate 104 is connected to the second input of OR gate 108.

The output of camera 17 is connected to the second input of inhibit gate 103, the output of which is connected to the second data input of electronic synthesizer circuit 78. The output of camera 16 is connected to the first data input of electronic synthesizer circuit 78, the data output of which is connected to the data input of projector 34.

The sync output of digital computer 32 is connected to the first inputs of AND gate 2 and AND gate 4, while the output of delay timer 54, FIG. 2, is connected to the first inputs of AND gate 1 and AND gate 3. The blanking signal output of projector 34 is connected to the first input of AND gate 7. The first control output of computer 32 is connected to the second input of AND gate 7 and the first input of OR gate 9.

The second control output of computer 32 is connected to the first input of NOR gate 10, while the third control output of computer 32 is connected to the first inputs of delay comparator 100, delay comparator 110, and delay comparator 120. The fourth control output of computer 32 is, in turn, connected to the second inputs of delay comparator 100, delay comparator 110, and delay comparator 120, while the fifth control output of computer 32 is connected to the second input of AND gate 104 and the second input of NOR gate 106.

The operation of the subject invention will now be discussed in conjunction with all of the figures of the drawing.

Referring now to FIG. 1, there is shown 360 degree reflective display screen 14 which has projected onto the inner surface thereof by suitable projecting means a background scene. As mentioned above, the aforementioned projecting means may be the 360 degree annular image transfer apparatus disclosed in U.S. Pat. No. 4,012,126 issued to Gottfried R. Rosendahl and Wiley V. Dykes.

Television cameras 16, 18, 20, 22, 24, and 26 each scan sixty degrees in the azimuthal direction of the background scene appearing on reflective display screen 14, and each provide, in response to the scanning of the aforementioned background scene thereby, a background scene information signal. The background scene information signals provided by cameras 16, 18, 20, 22, 24, and 26 are then supplied to the corresponding input-output terminals of electronic gating circuit 28 for processing thereby.

Television cameras 17, 19, 21, 23, 25 and 27, in turn, each scan target 30 and provide in response to the scanning of target 30 thereby, a target information signal. The target information signals provided by cameras 17, 19, 21, 23, 25, and 27 are then supplied to the corresponding data inputs of electronic gating circuit 28 for processing thereby.

Electronic gating circuit 28 then synthesizes the background scene information signals with the target information signals so as to produce six background scene-target information signals, each of which is supplied to the input-output terminal of one of the aforementioned projectors 34, 36, 38, 40, 42, and 44. Each projector 34 thru 44, in response to one of the background scene-target information signals, will broadcast upon one screen element 46 of display screen 48 a sixty degree segment of the background scene appearing on screen 14. In addition, each projector 36 thru 44, in response to the background scene-target information signals, will broadcast upon transparent display screen 48 for a predetermined time period target 30, with movement of target 30 in an azimuthal direction being controlled by computer 32 in accordance with the target movement control program utilized thereby. This, in turn, allows observer 50 to observe the movement of target 30 about transparent display screen 48.

With reference to FIGS. 1 and 4, it may be assumed in discussing the operation of the following portion of the subject invention that target 30 will not appear on transparent display screen 48. This, in turn, requires that computer 32 supply the first input of NOR gate 10, and the first input of NOR gate 106 a logic "1" signal, such that the outputs of NOR gates 10 and 106 are in a logic "0" state and the output of AND gate 10 is in a logic "0" state. Thus, the output of OR gate 108 will be in the logic "0" state, thereby inhibiting inhibit gate 103 such that the background scene information signal provided by camera 17 will not pass through display circuit 90 to the input of electronic synthesizer circuit 78. This, in turn, prevents projector 34 from broadcasting target 30 upon display screen 48. In a like manner, each of the remaining projectors 36, 38, 40, 42, and 44 may be inhibited from broadcasting target 30 upon display screen 48.

Figure 5:
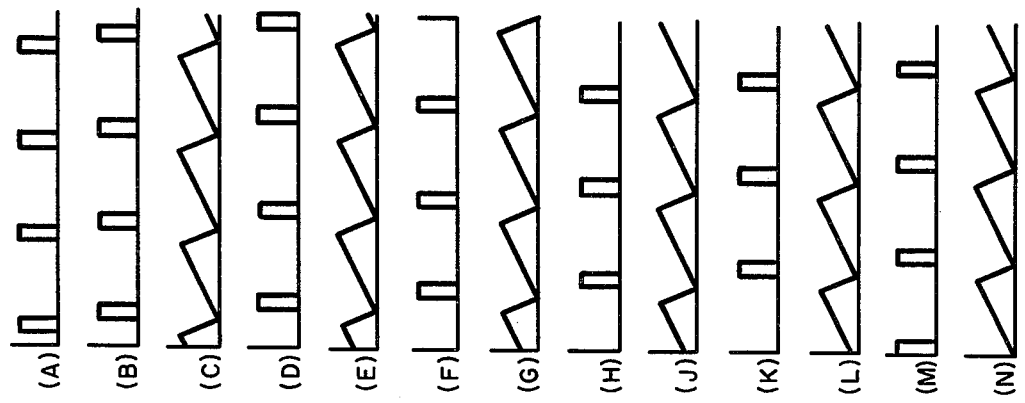
FIG. 5 is an idealized representation of various signal waveforms which emanate from some of the components of the system of FIG. 2.

Referring now to FIGS. 1, 2, 3, and 4, there is shown master clock signal generator 52 which provides at the output thereof a clock signal similar to that illustrated in FIG. 5(A). The clock signal of FIG. 5(A), in turn, provides a series of uniformly spaced pulses, the frequency of which is approximately 15.75 kilohertz.

The clock signal of FIG. 5(A) is then supplied to the inputs of delay timers 54, 56, 58, 60, 62, and 64. Delay timer 54, in turn, delays the clock signal of FIG. 5(A) for a first predetermined time period so as to provide at the output thereof a sync signal similar to that of FIG. 5(B). Similarly, delay timer 56 delays the clock signal of FIG. 5(A) for a second predetermined time period so as to provide at the output thereof a sync signal similar to that of FIG. 5(D). Likewise, delay timer 58 delays the clock signal of FIG. 5(A) for a third predetermined time period so as to provide at the output thereof a sync signal similar to that of FIG. 5(F).

Delay timer 60 delays the clock signal of FIG. 5(A) for a fourth predetermined time period so as to provide at the output thereof a sync signal similar to that depicted in FIG. 5(H). Similarly, delay timer 62 delays the clock signal of FIG. 5(A) for a fifth predetermined time period so as to provide at the output thereof a sync signal similar to that of FIG. 5(K).

Likewise, delay timer 64 delays the clock signal of FIG. 5(A) for a sixth predetermined time period so as to provide at the output thereof a sync signal similar to that of FIG. 5(M).

The sync signals of FIGS. 5(B), 5(D), 5(F), 5(H), 5(K), and 5(M) are then respectively supplied to the sync inputs of cameras 16, 18, 20, 22, 24, and 26 so as to activate cameras 16, 18, 20, 22, 24 and 26. Cameras 16, 18, 20, 22, 24 and 26 will, in turn, scan the background scene appearing upon screen 14 and provide in response to the scanning thereof, background scene information signals. The background scene information signals provided by cameras 16, 18, 20, 22, 24, and 26 are then respectively supplied through electronic synthesizer circuits 78 thru 88 to the data inputs of projectors 34 thru 44 since, as discussed previously, the inhibit gates 103 of display circuits 90, 92, 94, 96, 97, and 98 are inhibited, thereby preventing the target information signals provided by cameras 17, 19, 21, 23, 25, and 27 from passing through display circuits 90 thru 98 to the respective second data inputs of electronic synthesizer circuits 78 thru 88.

Simultaneously, the sync signals of FIGS. 5(B), 5(D), 5(F), 5(H), 5(K), and 5(M) are respectively supplied to the inputs of ramp voltage synthesizer circuits 66, 68, 70, 72, 74 and 76. Ramp voltage synthesizer circuit 66 will produce, in response to the sync signal of FIG. 5(B), a segmented sawtooth waveform signal similar to that depicted in FIG. 5(C); ramp voltage synthesizer circuit 68 will produce, in response to the sync signal of FIG. 5(D), a segmented sawtooth waveform signal similar to that depicted in FIG. 5(E); and ramp voltage synthesizer circuit 70 will produce, in response to the sync signal of FIG. 5(F), a segmented sawtooth waveform signal similar to that depicted in FIG. 5(G). Likewise, ramp voltage synthesizer circuit 72 will produce, in response to the sync signal of FIG. 5(H), a segmented sawtooth waveform signal similar to that depicted in FIG. 5(J); ramp voltage synthesizer circuit 74 will produce, in response to the sync signal of FIG. 5(K) a segmented sawtooth waveform signal similar to that depicted in FIG. 5(L); and ramp voltage synthesizer circuit 76 will produce, in response to the sync signal of FIG. 5(M), a segmented sawtooth waveform signal similar to that depicted in FIG. 5(N).

The sawtooth waveform signals of FIGS. 5(C), 5(E), 5(G), 5(J), 5(L), and 5(N) are then respectively supplied to the sync inputs of projectors 34 thru 44 so as to activate projectors 34 thru 44. This, in turn, allows projectors 34 thru 44 to broadcast, in response to the background scene information signals supplied to the data inputs thereof, the aforementioned background scene upon transparent display screen 48.

As mentioned above, the subject invention utilizes vertical scanning since matching of vertical scan lines between adjacent screen elements 46 of screen 48 is less difficult than matching of horizontal scan lines between the aforementioned adjacent screen elements 46. This, in turn, requires, as discussed previously, that cameras 16 thru 27, and projectors 34 thru 44 be rotated ninety degrees from their normal operating position.

In addition, as is discussed more fully in the aforementioned U.S. Pat. No. 4,197,509, ramp voltage synthesizer circuits 66, 68, 70, 72, 74, and 76 produce segmented sawtooth waveform signals so as to allow for the matching of vertical scan lines between adjacent screen elements 46 of transparent display screen 48, thereby eliminating the distortion from the visual image appearing upon transparent display screen 48 so as to significantly improve the resolution of the visual image appearing upon transparent display screen 48.

Further, the use of delayed sync signals by cameras 16 thru 26, as depicted in FIG. 5(B), 5(D), 5(F), 5(H), 5(K), and 5(M), and the use of delayed segmented sawtooth waveform signals by projectors 34 thru 44, eliminates from the visual image appearing upon adjacent screen elements 46 of transparent display screen 48 any black band which normally is associated with the vertical flyback time inherent within each camera-projector combination. Thus, for example, by delaying the sync signal of FIG. 5(D) with respect to the sync signal of FIG. 5(B), and thereby delaying the sawtooth waveform signal of FIG. 5(E) with respect to the sawtooth waveform signal of FIG. 5(C), the black band which is normally associated with the projection of a visual image by projectors 34 and 36 upon adjacent screen elements 46 of display screen 48 is eliminated therefrom. For a complete discussion of the elimination of black bands from the subject invention, reference is hereby made to Naval Training Equipment Center Technical Report 1H-268, entitled Non-programmed Multiple Channel Panoramic CCTV System, by John Kulik.

Referring now to FIGS. 1, 2, 3, and 4, the operation of the subject invention with target 30 moving in the azimuthal direction about display screen 48 will now be discussed.

Digital computer 32 supplies to the sync input of each camera 17, 19, 21, 23, 25, and 27 a sync signal, the frequency of which is 15.75 kilohertz, the same as the frequency of the clock signal provided by master clock signal generator 52. However, the sync signals supplied to each of the aforementioned cameras 17, 19, 21, 23, 25, and 27 by computer 32 may be in phase with, or be phase shifted from the sync signals provided by delay timers 54 thru 64. This, in turn, allows digital computer 32, in accordance with the target movement control program utilized thereby to control the movement of target 30 about screen 48.

Figure 6:
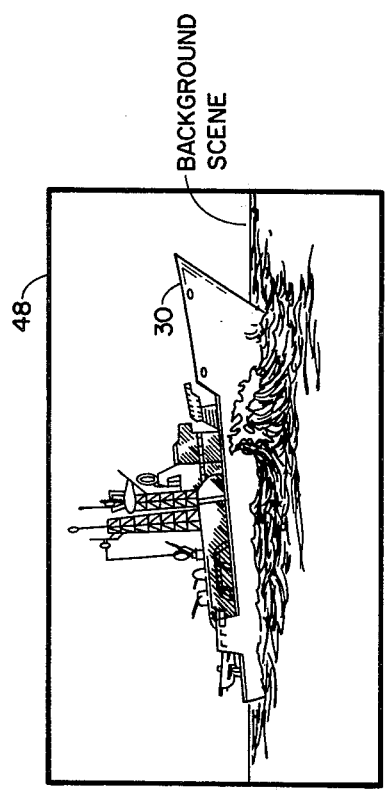
FIG. 6 depicts a target and background scene appearing in one position upon the transparent display screen of the invention of FIG. 1.

Thus, for example, when the sync signal supplied by computer 32 to camera 17 is in phase with the sync signal provided by delay timer 54, target 30 will be projected by projector 34 to the center of screen element 46 of display screen 48 as depicted in FIG. 6. Likewise, for example, when the sync signal supplied by computer 32 to camera 19 is in phase with the sync signal provided by delay timer 56, target 30 will be projected by projector 36 to the center of the adjacent screen element 46 of display screen 48 again as depicted in FIG. 6.

Figure 7:
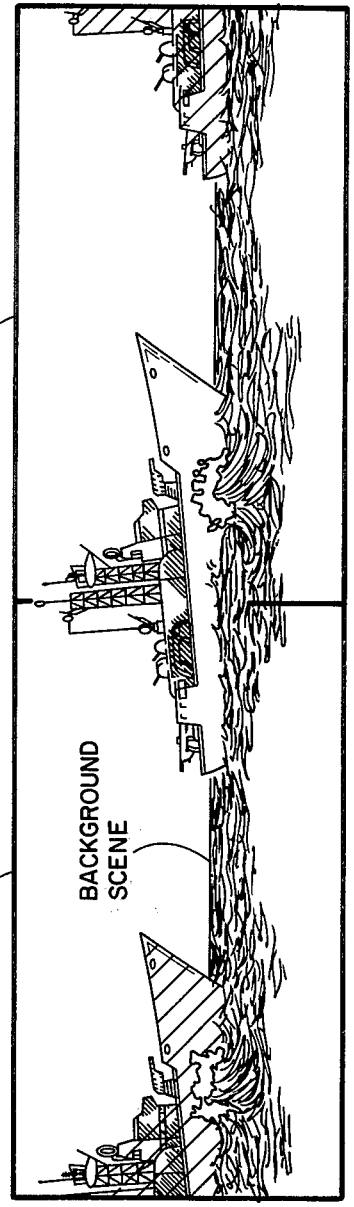
FIG. 7 depicts the target and background scene appearing in another position upon the transparent display screen of the invention of FIG. 1.

Similarly, as an example, when the sync signal supplied to camera 17 is delayed for a predetermined time period with respect to the sync signal provided delay timer 54, and the sync signal supplied to camera 19 is delayed for the same predetermined time period with respect to the sync signal provided by delay timer 56, target 30 will appear upon adjacent screen elements 46 of screen 48, as depicted in FIG. 7. Thus, by controlling the phase differential between the sync signals supplied to cameras 17, 19, 21, 23, 25, and 27, and the sync signals provided by delay timers 54 thru 64, computer 32 can effectively locate target 30 at any desired position on each screen element 46 of transparent display screen 48 with the appropriate blanking being provided by display circuits 90 thru 98 as will be explained below.

Referring now to FIGS. 1, 2, 3, 4, and 7, let it be assumed that target 30 is positioned as shown in FIG. 7, such that only projectors 34, and 36 will broadcast target 30 upon display screen. This, in turn, requires that inhibit gate 103 of display circuits 94, 96, 97, and 98 prevent the target information signals provided by cameras 21, 23, 25 and 27 from passing through the aforementioned display circuits 94, 96, 97, and 98. As disclosed above, computer 32 will supply logic "0" signals to NOR gates 10, and 106, and AND gates 104 of display circuits 94, 96, 97, and 98 so as to prevent the target information signals provided by cameras 21, 23, 25, and 27 from passing through display circuits 94, 96, 97, and 98.

In addition, let it be assumed that it is desired to blank out the visual image of target 30 appearing on the far left of screen 48, and the visual image of target 30 appearing on the far right of screen 48, such that only the visual image of target 30 located between adjacent screen elements 46 of display screen 48 is visible to observer 50.

This, in turn, requires that the sync pulse provided by delay circuit 54 be delayed with respect to the sync pulse provided by computer 32. In addition, when the sync pulse provided by delay circuit 54 is delayed with respect to the sync pulse provided by computer 32, computer 32 will supply to the first and second inputs of delay comparator 100 appropriate control signals such that the Y output of delay comparator 100 is in the logic "1" state, thereby enabling AND gates 1 and 4. Further, it should be noted that computer 32 will supply to AND gate 104 a logic "1" signal, thereby enabling AND gate 104 such that the output signal from NOR gate 10 will pass through AND gate 104 and OR gate 108 to inhibit gate 103.

An incoming sync pulse from delay timer 54 will pass through "AND" gate 1 and "OR" gate 5 to set flip-flop 102. This causes a logic "1" signal to pass through AND gate 8 which is enabled by the high output of missing pulse detector 101. Missing pulse detector 101, in turn, provides a logic "1" signal at the output thereof because the projector blanking pulse provided by projector 34 to the first input of AND gate 7 is not in phase with the camera blanking pulse provided by computer 32 to the second input of AND gate 7, thus causing the output of AND gate 7 to be in a logic "0" state, thereby enabling missing pulse detector 101.

The logic "1" signal then passes through OR gate 9 and causes NOR gate 10 to have a logic "0" output. The logic "0" signal from NOR gate "10" then passes AND gate 104 and OR gate 108 to inhibit gate 103. The logic "0" output applied to inhibit gate 103, in turn, inhibits any video information flow between camera 17 and projector 34 after the arrival of a sync pulse from delay timer 54 at AND gate 1. This, in turn, eliminates the unwanted image of the front half of target 30 shown cross hatched on the far left side of display screen 48 in FIG. 7.

No video information can pass from camera 17 through inhibit gate 103 to electronic synthesizer circuit 78, and thus to projector 34 until the next sync pulse provided by computer 32 arrives at AND gate 4 which is also enabled by the logic "1" signal at the Y output of comparator 100. This, in turn, causes a logic "1" signal from AND gate 4 to pass through "OR" gate 6 to reset flip-flop 102. This blocks AND gate 8 so that NOR gate 10 provides a logic "1" signal which passes through AND gate 104 and OR gate 108 to inhibit gate 103, thereby enabling inhibit gate 103 such that the target information signal provided by camera 17 will pass through inhibit gate 10 to electronic synthesizer circuit 78. Electronic synthesizer circuit 78 will combine the above mentioned target information signal with the background scene information signal provided by camera 16 so as to form a background scene-target information signal which is then supplied to the data input of projector 34 such that projector 34 will broadcast the rear half of target 30 upon display screen 48.

Display circuit 92 operates in almost the same manner as display circuit 90 such that projector 36 will broadcast only the front half of target 30 upon display screen 48. Accordingly, a detailed description of the operation of display circuit 92 will not be presented. However, it should be noted that computer 32 will supply to AND gate 104 and NOR gate 106 of display circuit 92 a logic "0" signal such that the signal from NOR gate 10 will be inverted by NOR gate 106 before being supplied to inhibit gate 103 of display circuit 92. This, in turn, eliminates the unwanted image of the rear half of target 30 shown cross hatched on the right side of display screen 48 such that target 30 will appear on screen 48 as shown in FIG. 7.

From the foregoing, it may readily be seen that the subject invention comprises a new, unique and exceedingly useful 360 degree closed circuit television system which constitutes a considerable improvement over the known prior art. Obviously, many modifications and variations of the present invention are possible in light of the above teachings. It is, therefore, to be understood that within the scope of the appended claims the invention may be practical otherwise than as specifically described.

What is claimed is:

1. A 360 degree closed circuit television system comprising, in combination:

a 360 degree reflective display screen;

a background scene broadcast upon said 360 degree reflective display screen;

a plurality of background scene detecting means positioned within said 360 degree reflective display screen off the center thereof adapted for scanning said background scene with each of said detecting means scanning a predetermined angular segment in an azimuthal direction of said background scene, and providing, in response to the scanning of said background scene thereby, a background scene information signal, each of said background scene detecting means having a sync input and an output;

a target;

a plurality of target detecting means positioned adjacent to said target, each of said target detecting means having a sync input and an output adapted for scanning said target, and providing, in response to the scanning of said target thereby, a target information signal;

a transparent display screen having a plurality of rectangular shaped screen elements;

a plurality of projecting means, each projecting means of which has a sync input, a data input, and a blanking signal output, and each projecting means of which is positioned adjacent the outer surface of one of the screen elements of said transparent display screen for broadcasting upon the screen element of said transparent display screen positioned adjacent thereto one of the angular segments of said background scene, and said target for a predetermined time period such that an observer will observe the movement of said target upon said background scene around said transparent display screen;

master clock signal generating means having an output for producing a master clock signal having a series of uniformly spaced pulses of predetermined frequency;

a plurality of timing means, each timing means of which has an input connected to the output of said master clock signal generating means, and an output adapted for producing a plurality of sync signals, each sync signal of which is delayed for a predetermined time period from the master clock signal produced by said master clock signal generating means, and each sync signal of which activates one of said plurality of background scene detecting means so as to effect the scanning of said background scene thereby;

a plurality of waveform generating means, each of which has an input and an output with the inputs thereof respectively connected to the outputs of said plurality of timing means, and the outputs thereof respectively connected to the sync inputs of said plurality of projecting means adapted for producing, in response to the sync signals produced by said plurality of timing means, a plurality of segmental sawtooth waveform signals, each segmental sawtooth waveform signal of which activates one of said plurality of projecting means such that said plurality of projecting means will broadcast upon said transparent display screen said background scene and said target so as to eliminate from said background scene and said target any distortion therein, thereby improving the resolution thereof;

computing means having a plurality of sync outputs respectively connected to the sync inputs of said plurality of target detecting means, and a control output terminal for providing, in accordance with a target movement program utilized thereby, a plurality of sync signals so as to effect the activation of said plurality of target detecting means, for controlling the phase difference of the sync signals provided thereby with respect to the sync signals provided by said plurality of timing means so as to effect the movement of said target around said transparent display screen, and for producing at the control output terminal thereof a plurality of logic signals;

video information gating circuit means having a plurality of sync inputs respectively connected to the outputs of said plurality of timing means, a plurality of first data inputs respectively connected to the outputs of said plurality of background scene detecting means, a plurality of second data inputs respectively connected to the outputs of said plurality of target detecting means, a plurality of signal blanking inputs respectively connected to the signal blanking outputs of said plurality of projecting means, a control input terminal connected to the control output terminal of said computing means, and a plurality of outputs respectively connected to the data inputs of said plurality of projecting means adapted for synthesizing said target information signals with said background scene information signals so as to form a plurality of background scene-target information signals and thereby effect the broadcasting by said plurality of projecting means of said background scene and said target upon said transparent display screen, and for providing, in response to the logic signals produced by said computing means, for the blanking of multiple visual images of said target such that only one visual image of said target is visible upon said transparent display screen.

2. The 360 degree closed circuit television system of claim 1, wherein each of said background scene detecting means comprises a television camera.

3. The 360 degree closed circuit television system of claim 1, wherein each of said target detecting means comprises a television camera.

4. The 360 degree closed circuit television system of claim 1, wherein said target comprises a battleship.

5. The 360 degree closed circuit television system of claim 1, wherein said target comprises an aircraft.

6. The 360 degree closed circuit television system of claim 1, wherein said observer is a pilot.

7. The 360 degree closed circuit television of claim 1, wherein each of said timing means comprises a monostable multivibrator.

8. The 360 degree closed circuit television system of claim 1, wherein said video information gating circuit means comprises:

a plurality of gated video display circuits, each of which has a data input, a sync input, a blanking signal input, a control input terminal, and an output, with the data inputs thereof respectively connected to the outputs of said plurality of target detecting means, the sync inputs thereof respectively connected to the outputs of said plurality of timing means, the blanking signal inputs thereof respectively connected to the blanking signal outputs of said plurality of projecting means, and the control input terminals thereof connected to the control input terminal of said computing means; and a plurality of electronic synthesizer circuits, each of which has a first data input, and a second data input, with the first data inputs thereof respectively connected to the outputs of said background scene detecting means, and the second data inputs thereof connected to the outputs of said plurality of gated video display circuits.

9. The 360 degree closed circuit television system of claim 8 wherein each of said gated video display circuits comprises:

a first AND gate having first and second inputs, and an output;

a second AND gate having first and second inputs, and an output;

a first OR gate having a first input connected to the output of said first AND gate, a second input connected to the output of said second AND gate, and an output;

a third AND gate having a first input connected to the first input of said first AND gate, a second input, and an output;

a fourth AND gate having a first input connected to the first input of said second AND gate, a second input, and an output;

a second OR gate having a first input connected to the output of said third AND gate, a second input connected to the output of said fourth AND gate, and an output;

an RS flip-flop having a set input connected to the output of said first OR gate, a reset input connected to the output of said second OR gate, and an output;

a fifth AND gate having an input, and an output;

a sixth AND gate having a first input connected to the output of said RS flip-flop, a second input, and an output;

a missing pulse detector having an input connected to the output of said fifth AND gate, and an output connected to the second input of said sixth AND gate;

a first delay comparator having first and second inputs, a first output connected to the second input of said second AND gate and the second input of said third AND gate, and a second output connected to the second input of said first AND gate and the second input of said fourth AND gate;

a second delay comparator having a first input connected to the first input of said first delay comparator, a second input connected to the second input of said first delay comparator, and an output;

a third delay comparator having a first input connected to the second input of said first delay comparator and the second input of said second delay comparator, a second input connected to the first input of said first delay comparator and the first input of said second delay comparator, and an output;

a third OR gate having a first input connected to the output of said sixth AND gate, a second input connected to the output of said second delay comparator, a third input connected to the output of said third delay comparator, a fourth input connected to the input of said fifth AND gate, and an output;

a first NOR gate having an input connected to the output of said third OR gate, and an output;

a second NOR gate having a first input connected to the output of said first NOR gate, a second input, and an output;

a seventh AND gate having a first input connected to the output of said first NOR gate, a second input connected to the second input of said second NOR gate, and an output;

a fourth OR gate having a first input connected to the output of said seventh AND gate, a second input connected to the output of said second NOR gate, and an output; and an inhibit gate having an input connected to the output of said third OR gate.

10. The 360 degree closed circuit television system of claim 1, further characterized by a 360 degree annular image transfer apparatus positioned so as to project upon said 360 degree reflective display screen said background scene.

11. A display apparatus comprising, in combination:

a 360 degree reflective display screen;

a background scene broadcast upon said 360 degree reflective display screen;

first, second, third, fourth, fifth, and sixth background scene cameras positioned within said 360 degree reflective display screen off the center thereof such that each of said background scene cameras scans a sixty degree segment in an azimuthal direction of the background scene broadcast upon said 360 degree reflective display screen, each of said background scene cameras having a sync input, and an output;

a target;

first, second, third, fourth, fifth, and sixth target cameras positioned adjacent to said target such that each of said target cameras continuously scans said target, each of said target cameras having a sync input, and an output;

a hexagonal shaped transparent display screen having six rectangular shaped screen elements;

first, second, third, fourth, fifth, and sixth projectors positioned adjacent to the outer surface of said hexagonal shaped transparent display screen so as to allow each of said projectors to broadcast upon one of the six screen elements of said hexagonal shaped transparent display screen one of the sixty degree segments of said background scene and said target for a predetermined time period such that an observer will observe the movement of said target upon said background scene around said hexagonal shaped transparent display screen, each of said first, second, third, fourth, fifth, and sixth projectors having a sync input, a data input, and a blanking signal output;

a master clock signal generator having an output;

a first delay timer, having an input connected to the output of said master clock signal generator and an output connected to the sync input of said first background scene camera;

a first ramp voltage synthesizer circuit having an input connected to the output of said first delay timer and an output connected to the sync input of said first projector;

a second delay timer having an input connected to the output of said master clock signal generator and an output connected to the sync input of said second background scene camera;

a second ramp voltage synthesizer circuit having an input connected to the output of second delay timer and an output connected to the sync input of said second projector;

a third delay timer having an input connected to the output of said master clock signal generator and an output connected to the sync input of said third background scene camera;

a third ramp voltage synthesizer circuit having an input connected to the output of said third delay timer and an output connected to the sync input of said third projector;

a fourth delay timer having an input connected to the output of said master clock signal generator and an output connected to the sync input of said fourth background scene camera;

a fourth ramp voltage synthesizer circuit having an input connected to the output of said fourth delay timer and an output connected to the sync input of said fourth projector;

a fifth delay timer having an input connected to the output of said master clock signal generator and an output connected to the sync input of said fifth background scene camera;

a fifth ramp voltage synthesizer circuit having an input connected to the output of said fifth delay timer and an output connected to the sync input of said fifth projector;

a sixth delay timer having an input connected to the output of said master clock signal generator and an output connected to the sync input of said sixth background scene camera;

a sixth ramp voltage synthesizer circuit having an input connected to the output of said sixth delay timer and an output connected to the sync input of said sixth projector;

a first gated video display circuit having a data input connected to the output of said first target camera, a sync input connected to the output of said first delay timer, a blanking signal input connected to the blanking signal output of said first projector, a control input terminal, and an output;

a first electronic synthesizer circuit having a first data input connected to the output of said first background scene camera, a second data input connected to the output of said first gated video display circuit and an output connected to the data input of said first projector;

a second gated video display circuit having a data input connected to the output of said second target camera, a sync input connected to the output of said second delay timer, a blanking signal input connected to the blanking signal output of said second projector, a control input terminal, and an output;

a second electronic synthesizer circuit having a first data input connected to the output of said second background scene camera, a second data input connected to the output of said second gated video display circuit, and an output connected to the data input of said second projector;

a third gated video display circuit having a data input connected to the output of said third target camera, a sync input connected to the output of third delay timer, a blanking signal input connected to the blanking signal output of said third projector, a control input terminal, and an output;

a third electronic synthesizer circuit having a first data input connected to the output of said third background scene camera, a second data input connected to the output of said third gated video display circuit, and an output connected to the data input of said third projector;

a fourth gated video display circuit having a data input connected to the output of said fourth target camera, a sync input connected to the output of said fourth delay timer, a blanking signal input connected to the blanking signal output of said fourth generator, a control input terminal, and an output;

a fourth electronic synthesizer circuit having a first data input connected to the output of said fourth background scene camera, a second data input connected to the output of said fourth gated video display circuit, and an output connected to the data input of said fourth projector;

a fifth gated video display circuit having a data input connected to the output of said fifth target camera, a sync input connected to the output of said fifth delay timer, a blanking signal input connected to the blanking signal output of said fifth projector, a control input terminal, and an output;

a fifth electronic synthesizer circuit having a first data input connected to the output of said fifth background scene camera, a second data input connected to the output of said fifth gated video display circuit, and an output connected to the data input of said fifth projector;

a sixth gated video display circuit having a data input connected to the output of said sixth target camera, a sync input connected to the output of said sixty delay timer, a blanking signal input connected to the blanking signal output of said sixth projector, a control input terminal, and an output;

a sixth electronic synthesizer circuit having a first data input connect to the output of said sixth background scene camera, a second data input connected to the output of said sixth gated video display circuit, and an output connected to the data input of said sixth projector; and a digital computer having first, second, third, fourth, fifth, and sixth sync outputs respectively connected to the sync inputs of said first, second, third, fourth, fifth, and sixth target cameras, and a control output terminal effectively connected to the control input terminals of said first, second, third, fourth, fifth, and sixth gated video display circuits.

12. The display apparatus of claim 11 wherein said target comprises a battleship.

13. The display apparatus of claim 11 wherein said target comprises an aircraft.

14. The display apparatus of claim 11 wherein each of said delay timers comprises a monostable multivibrator.

15. The display of claim 11 wherein each of said gated video display circuits comprises:

a first AND gate having first and second inputs, and an output;

a second AND gate having first and second inputs, and an output;

a first OR gate having a first input connected to the output of said first AND gate, a second input connected to the output of said second AND gate, and an output;

a third AND gate having a first input connected to the first input of said first AND gate, a second input, and an output;

a fourth AND gate having a first input connected to the first input of said second AND gate, a second input, and an output;

a second OR gate having a first input connected to the output of said third AND gate, a second input connected to the output of said fourth AND gate, and an output;

an RS flip-flop having a set input connected to the output of said first OR gate, a reset input connected to the output of said second OR gate, and an output;

a fifth AND gate having an input, and an output;

a sixth AND gate having a first input connected to the output of said RS flip-flop, a second input, and an output;

a missing pulse detector having an input connected to the output of said fifth AND gate, and an output connected to the second input of said sixth AND gate;

a first delay comparator having first and second inputs, a first output connected to the second input of said second AND gate and the second input of said third AND gate, and a second output connected to the second input of said first AND gate and the second input of said fourth AND gate;

a second delay comparator having a first input connected to the first input of said first delay comparator, a second input connected to the second input of said first delay comparator, and an output;

a third delay comparator having a first input connected to the second input of said first delay comparator and the second input of said second delay comparator, a second input connected to the first input of said first delay comparator and the first input of said second delay comparator, and an output;

a third OR gate having a first input connected to the output of said sixth AND gate, a second input connected to the output of said second delay comparator, a third input connected to the output of said third delay comparator, a fourth input connected to the input of said fifth AND gate, and an output;

a first NOR gate having an input connected to the output of said third OR gate, and an output;

a second NOR gate having a first input connected to the output of said first NOR gate, a second input, and an output;

a seventh AND gate having a first input connected to the output of said first NOR gate, a second input connected to the second input of said second NOR gate, and an output;

a fourth OR gate having a first input connected to the output of said seventh AND gate, a second input connected to the output of said second NOR gate and an output; and an inhibit gate having an input connected to the output of said third OR gate.

16. The display apparatus of claim 11 further characterized by a 360 degree annular image transfer apparatus positioned so as to project upon said 360 degree reflective display screen said background scene.

* * * * *